United States Patent
Yamamoto

(10) Patent No.: US 9,558,897 B2
(45) Date of Patent: Jan. 31, 2017

(54) ACTUATOR CONTROL METHOD AND ACTUATOR CONTROL DEVICE

(75) Inventor: Yasushi Yamamoto, Chigasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 550 days.

(21) Appl. No.: 14/232,167

(22) PCT Filed: Jun. 21, 2012

(86) PCT No.: PCT/JP2012/065886
§ 371 (c)(1),
(2), (4) Date: Mar. 20, 2014

(87) PCT Pub. No.: WO2013/008602
PCT Pub. Date: Jan. 17, 2013

(65) Prior Publication Data
US 2014/0252885 A1   Sep. 11, 2014

(30) Foreign Application Priority Data

Jul. 12, 2011   (JP) ................. 2011-153498

(51) Int. Cl.
*H01H 9/00*        (2006.01)
*G05B 19/416*      (2006.01)

(52) U.S. Cl.
CPC ............... *H01H 9/00* (2013.01); *G05B 19/416* (2013.01); *G05B 2219/39357* (2013.01);
(Continued)

(58) Field of Classification Search
CPC ...................................................... H01H 9/00
(Continued)

(56) References Cited

U.S. PATENT DOCUMENTS 5,119,250 A   6/1992  Green et al.
5,602,689 A * 2/1997  Kadlec ............. G11B 5/5534
                                                 360/78.04
(Continued)

FOREIGN PATENT DOCUMENTS

EP   0 103 493 A1   3/1984
EP   0461915 A2     12/1991
(Continued)

OTHER PUBLICATIONS

Patent Abstracts of Japan, Publication No. 05-224702, Published Sep. 3, 1993.
(Continued)

*Primary Examiner* — Stephen W Jackson
(74) *Attorney, Agent, or Firm* — Staas & Halsey LLP

(57) ABSTRACT

An actuator control method and an actuator control device that incorporate an element of feedback control in time optimal control, including: a calculation step of calculating a switching time at which an acceleration output is switched to a deceleration output and an end time of the deceleration output expressed by time elapsed from a calculation time at which calculation for control is performed using a maximum acceleration and a maximum deceleration, which are measured in advance, at the time of the maximum output of control force of an actuator; a control output step of setting the control force of the actuator to a maximum acceleration output from the calculation time to the switching time, setting the control force of the actuator to a maximum deceleration output from the switching time to the end time, and ending the output of the control force at the end time, and an update step of calculating and updating the switching time and the end time by repeating the calculation step at each preset time.

4 Claims, 8 Drawing Sheets

(52) U.S. Cl.
CPC .............. *G05B 2219/41086* (2013.01); *G05B 2219/41087* (2013.01); *G05B 2219/43041* (2013.01); *G05B 2219/43045* (2013.01); *G05B 2219/43099* (2013.01); *G05B 2219/43112* (2013.01); *G05B 2219/43114* (2013.01); *Y10T 307/951* (2015.04)

(58) Field of Classification Search
USPC ........................................................ 307/141
See application file for complete search history.

(56) References Cited

U.S. PATENT DOCUMENTS

| | | | |
|---|---|---|---|
| 5,677,609 | A | 10/1997 | Khan et al. |
| 6,002,184 | A * | 12/1999 | Delson ................... H02K 23/00 273/148 R |
| 6,686,716 | B1 | 2/2004 | Predina et al. |
| 8,024,052 | B1 * | 9/2011 | Hakala ................. G05B 13/024 273/148 R |

FOREIGN PATENT DOCUMENTS

| | | |
|---|---|---|
| JP | 58-119004 | 7/1983 |
| JP | 61-77905 | 4/1986 |
| JP | 62-120515 | 6/1987 |
| JP | 5-224702 | 9/1993 |
| JP | 7-302121 | 11/1995 |
| JP | 11-296234 | 10/1999 |
| JP | 2000-94371 | 4/2000 |
| JP | 2011-85984 | 4/2011 |

OTHER PUBLICATIONS

Patent Abstracts of Japan, Publication No. 11-296234, Published Oct. 29, 1999.
Patent Abstracts of Japan, Publication No. 07-302121, Published Nov. 14, 1995.
Patent Abstracts of Japan, Publication No. 2000-094371, Published Apr. 4, 2000.
International Search Report for PCT/JP2012/065886, mailed Jul. 17, 2012.
Annex to the European Search Report dated Nov. 10, 2015 in corresponding European Patent Application No. 12811162.
Patent Abstracts of Japan, Publication No. 61-77905, Published Apr. 21, 1986.
Patent Abstracts of Japan, Publication No. 58-119004, Published Jul. 15, 1983.
Patent Abstracts of Japan, Publication No. 62-120515, Published Jun. 1, 1987.
International Search Report mailed Sep. 4, 2012, in related International Application No. PCT/JP2012/070480.
Office Action for U.S. Appl. No. 14/345,167, issued Jun. 30, 2016.
U.S. Appl. No. 14/345,167, filed Mar. 14, 2014, Yasushi Yamamoto, Isuzu Motors Limited.

* cited by examiner

ACTUATOR CONTROL METHOD AND ACTUATOR CONTROL DEVICE

This application claims the benefit under 35 U.S.C. Section 371, of PCT International Application No. PCT/JP2012/065886, filed Jun. 21, 2012, and under 35 U.S.C. §119 of Japanese Application No. 2011-153498 filed Jul. 12, 2011, the contents of which are incorporated herein by reference.

TECHNICAL FIELD

The present invention relates to an actuator control method and an actuator control device and, more particularly, to an actuator control method and an actuator control device capable of incorporating the element of feedback by using a control law that modifies an output pattern at each preset time in time optimal control.

BACKGROUND ART

In the conventional control, the feedback control of PID control has been generally used. In the PID control, a control output is always determined with a delay from a phenomenon, and therefore, if each control gain of PID is increased in an attempt to increase the control speed, the control no longer catches up with the phenomenon, and therefore, the control becomes unstable. In particular, if a mechanical damping force of a controlled object reduces remarkably, the control tends to become unstable and there is a case where the control diverges. As a method for determining each control gain of the PID control in order to avoid the instability of control, a control theory, such as an H∞, capable of ensuring the stability of control is applied. However, under the restrictions of the PID control, overshoot or control delay occurs due to load fluctuation.

In the PID control also, if sliding mode control is used, it is possible to theoretically eliminate the influence of load fluctuation by switching control gains in accordance with the control state. However, if the control period is lengthened, this control keeps oscillating and no longer converges. Because of this, in order to completely eliminate the influence of load fluctuation, it is necessary to switch control gains at infinitely high speed, and control at speed that can be said as infinitely high speed for a phenomenon will be necessary. Further, adjustment of each control gain, such as PID, is necessary and the quality of the adjustment of control gain determines the quality of control, and therefore, the adjustment of control gain becomes a very important factor.

Furthermore, these control theories are for making up for faults of the PID control and are not methods designed for the purpose of control to "cause a controlled object to stay at a target position in the shortest time". Because of, this, for this simple purpose, it can be said that the time optimal control is a control method more suitable to the purpose rather than the PID control.

The simplest time optimal control is a control to cause a controlled object to stay at a target position by accelerating the controlled object by a maximum thrust force up to the middle on the way to the target position and by decelerating it at a maximum deceleration for the rest of the way. This output pattern is determined before the control is started, and therefore, the time optimal control can be referred to as feedforward control.

In other words, the time optimal control is a control method for moving a controlled object by a maximum driving force of an actuator and stopping it by a maximum braking force, and is theoretically a control capable of causing the controlled object to stay at the target in the shortest time. That is, the time optimal control is a control method that perfectly meets the purpose of control to "cause a controlled object to stay at a target position in the shortest time".

For example, as described in Japanese patent application Kokai publication No. 2000-94371, as a control device using the time optimal control, the time optimal control device of a robot is proposed, which includes a control unit configured to control a servomotor, a correspondence relationship storage unit configured to store a relationship between a controlled variable on the basis of the value at the time of no load and a load weight, a load estimation calculation unit, an acceleration/deceleration constant determination unit configured to determine acceleration/deceleration constants based on workpiece information calculated by the load estimation calculation unit, and a command creation unit configured to create a command to be delivered to the servo control unit using the determined acceleration/deceleration constants, and which lengthens the acceleration time when grasping a workpiece and shortens the acceleration time when not grasping a workpiece.

However, while the time optimal control is theoretically an ideal control capable of control with the shortest time, it is an open control in which the output pattern is determined by taking into consideration the initial velocity, the maximum acceleration, and the maximum deceleration, and because there is no feedback element, there is such a problem that no modification method is available when the target and the controlled variable do not agree and it is difficult to cause the target and the controlled variable to agree accurately, and therefore, it is rarely adopted in actual control.

PRIOR ART DOCUMENT

Patent Document 1: Japanese patent application Kokai publication No. 2000-94371

SUMMARY OF THE INVENTION

The present invention has been developed in view of the above-mentioned circumstances and an object thereof is to provide an actuator control method and an actuator control device having incorporated the element of feedback control into the time optimal control.

The actuator control method of the present invention in order to achieve the above-mentioned object is a method, characterized in that the method uses the time optimal control and includes: a calculation step of calculating a switching time t1 at which an acceleration output is switched to a deceleration output and an end time t2 of the deceleration output expressed by time elapsed from a calculation time t0 at which calculation for control is performed using a maximum acceleration $\alpha p$ and a maximum deceleration $\alpha m$, which are measured in advance, at the time of the maximum output of control force of the actuator; and a control output step of setting the control force of the actuator to a maximum acceleration output from the calculation time t0 to the switching time t1, setting the control force of the actuator to a maximum deceleration output from the switching time t1 to the end time t2, and ending the output of the control force at the end time t2, and the method also calculates and updates the switching time t1 and the end time t2 by repeating the calculation step at each preset time.

That is, a target trajectory of control from a position of the controlled object at the calculation time t0 to a target position is recalculated in each fixed period, that is, at each preset time, or irregularly, by taking into consideration deviation and velocity, and the switching time t1 and the end time t2 are updated. The switching time t1 and the end time t2 are the times elapsed from the calculation time t0 at which recalculation is performed.

The maximum acceleration αp or the maximum deceleration αm is a second-order time-derivative value of a controlled value or a second-order difference value of the controlled value and it is also possible to apply, for example, temperature the controlled value of which does not involve motion.

According to this method, the control speed becomes high because of the time optimal control, the maximum acceleration αp and the maximum deceleration αm can be set by measurement, and it is not necessary to adjust the control gain because there is no item to be adjusted other than this. Further, it is not necessary to produce an intermediate output because of ON/OFF control, and therefore, it is possible to simplify the controller and driver.

Further, the element of feedback is incorporated, in which the switching time t1 and the end time t2, which are expressed by time elapsed from the calculation time t0 of recalculation, are updated by performing calculation again by inputting deviation X between a target amount and the controlled variable at each time of control at each preset time, and therefore, even if the external force changes, or without shortening the time interval of control, it is possible to obtain a stable control result at all times. As a result of that, it is possible to satisfy both of "control speed" and "stability", which have been big conflicting issues in the conventional control law.

Furthermore, in the above-mentioned actuator control method, at the calculation step, in a case where a trajectory from the position at the calculation time t0 to the target position at the end time t2 is represented by a combination of two quadratic curves in contact with each other, initial velocity is taken to be V0, and deviation between the target position and the controlled variable is taken to be X, it is possible to easily calculate the switching time t1 and the end time t2 by calculating the switching time t1 and the end time t2 using Expression (1) and Expression (2) below.

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

Here, α1 is the maximum acceleration αp or the maximum deceleration αm between the calculation time t0 and the switching time t1 and α2 is the maximum deceleration αm or the maximum acceleration αp between the switching time t1 and the end time t2.

Then, the actuator control device of the present invention in order to achieve the above-mentioned object uses the time optimal control and includes: a calculation unit configured to calculate the switching time t1 at which an acceleration output is switched to a deceleration output and the end time t2 of the deceleration output expressed by time elapsed from the calculation time t0 at which calculation for control is performed using the maximum acceleration αp and the maximum deceleration αm, which are measured in advance, at the time of the maximum output of control force of the actuator; and a control output unit configured to set the control force of the actuator to the maximum acceleration output from the calculation time t0 to the switching time t1, to set the control force of the actuator to the maximum deceleration output from the switching time t1 to the end time t2, and to end the output of the control force at the end time t2, and the device also includes an update unit configured to repeatedly calculate and update the switching time t1 and the end time t2 by the calculation unit at each preset time.

Further, in the above-mentioned actuator control device, the calculation unit is configured to, in the case where the trajectory from the position at the calculation time t0 to the target position at the end time t2 is represented by two quadratic curves in contact with each other, the initial velocity is taken to be V0, and the deviation between the target position and the controlled variable is taken to be X, calculate the switching time t1 and the end time t2 using Expression (1) and Expression (2) below.

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

Here, α1 is the maximum acceleration αp or the maximum deceleration can between the calculation time t0 and the switching time t1 and α2 is the maximum deceleration αm or the maximum acceleration αp between the switching time t1 and the end time t2.

Furthermore, in the above-mentioned actuator control device, the acceleration αp from the calculation time t0 to the switching time t1 and the acceleration αm from the switching time t1 to the end time t2 are determined from Table 1.

TABLE 1

| | | | | |
|---|---|---|---|---|
| A1 | X > 0 | $V_0 > 0$ | $V_0^2/2\ \alpha m > X$ | α 1 = αm, α 2 = αp |
| A2 | | | $V_0^2/2\ \alpha m < X$ | α 1 = αp, α 2 = αm |
| A3 | | $V_0 < 0$ | | α 1 = αp, α 2 = αm |
| A4 | X < 0 | $V_0 > 0$ | | α 1 = αm, α 2 = αp |
| A5 | | $V_0 < 0$ | $V_0^2/2\ \alpha p > X$ | α 1 = αm, α 2 = αp |
| A6 | | | $V_0^2/2\ \alpha p < X$ | α 1 = αp, α 2 = αm |

According to the actuator control device with these configurations, it is possible to perform the above-mentioned actuator control method and to obtain the same effect.

According to the actuator control method and the actuator control device according to the present invention, the control speed becomes high because of the time optimal control, the maximum acceleration and the maximum deceleration can be set by measurement, and it is not necessary to adjust the control gain because there is no item to be adjusted other than this. Further, it is not necessary to produce an intermediate output because of the ON/OFF control, and therefore, it is possible to simplify the controller and driver.

Further, the element of feedback is incorporated, in which the switching time and the end time are updated by inputting the deviation between the target amount and the controlled variable at each time of control at each preset time, and therefore, even if the external force changes, or without shortening the time interval of control, it is possible to obtain a stable control result at all times. As a result of that, it is possible to satisfy both of "control speed" and "stability", which have been big conflicting issues in the conventional control law.

DESCRIPTION OF EMBODIMENTS

Hereinafter, an actuator control method and an actuator control device of an embodiment according to the present invention are explained with reference to drawings. Here, in order to clarify time optimal control of the present invention, explanation is given in comparison with PID control.

The actuator control device of the embodiment according to the present invention uses the time optical control and includes a calculation unit, a control force output unit, and an update unit.

The calculation unit calculates a switching time t1 at which an acceleration output is switched to a deceleration output and an end time t2 of the deceleration output expressed by time elapsed from a calculation time t0 at which calculation for control is performed using a maximum acceleration αp and a maximum deceleration αm, which are measured in advance, at the time of a maximum output of control force of the actuator.

Moreover, the control output unit sets the control force of the actuator to a maximum acceleration output from the calculation time t0 to the switching time t1, sets the control force of the actuator to a maximum deceleration output from the switching time t1 to the end time t2, and ends the output of the control force at the end time t2.

Further, the update unit is configured to repeatedly calculate and update the switching time t1 and the end time t2 by the calculation unit at each time in a fixed period or preset irregularly. The calculation unit, in a case where a trajectory from a position at the calculation time t0 at which recalculation is performed to a target position is represented by a combination of two quadratic curves in contact with each other, initial velocity is taken to be V0, and deviation between a target amount and a controlled variable is taken to be X, calculates the switching time t1 and the end time t2 using Expression (1) and Expression (2) below.

(Formula 1)

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)}$$

Expression (1)

(Formula 2)

$$t2 = \frac{-(\alpha 1 - \alpha 2)t1 - V0}{\alpha 2}$$

Expression (2)

Here, α1 is the maximum acceleration αp or the maximum deceleration αm between the calculation time t0 and the switching time t1 and α2 is the maximum deceleration αm or the maximum acceleration αp between the switching time t1 and the end time t2.

Figure 1:
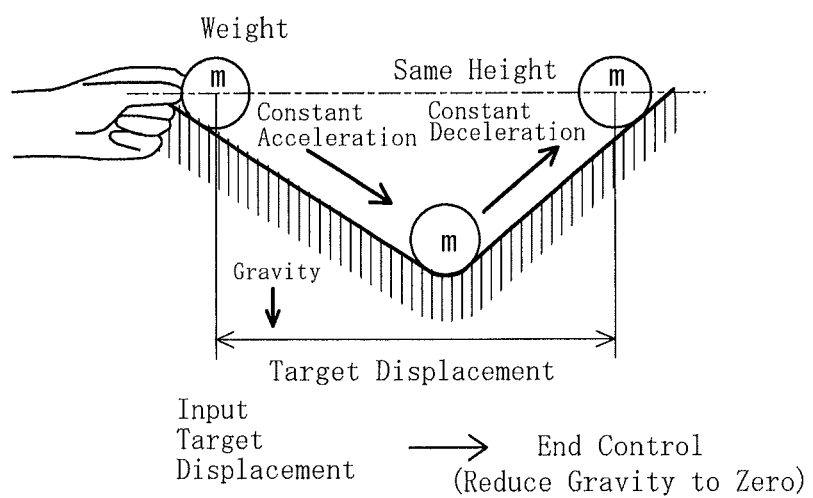
FIG. 1 is a diagram showing a time optimal control model for explaining time optimal control used in an actuator control method of an embodiment of the present invention.

Furthermore, the time optimal control used in the actuator control method of the embodiment of the present invention is equivalent to a mechanical model in which a weight m shown in FIG. 1 descends and ascends a slope. As in FIG. 1, when the weight is lifted from the slope and then is released, the weight descends the slope at constant acceleration by the gravity and then ascends the slope on the opposite side at constant deceleration. If there is no energy loss due to friction etc., the velocity of the weight m becomes zero when it ascends to the same height as the initial position and stops for a moment. If the gravity is eliminated at this point of time, the weight m continues to stay at the position.

This is considered in a control system in which a controlled object is moved by an actuator in place of the mechanical model. If the weight is pressed by the maximum thrust force of the actuator and then the weight is pulled back by the maximum thrust force of the actuator, when the work input when thrusting the weight becomes equal to the work input when pulling back the weight, the controlled object stops. If the position where the controlled object stops in this way is the target position, the control is ended.

That is, in the time optimal control, since the controlled object is accelerated and decelerated by the maximum thrust force of the actuator and thus is controlled to the target position, it is theoretically possible to perform the control in the shortest time. Further, the control output pattern at this time is determined before the control is started, and therefore, the time optimal control is a feedforward control.

Figure 12:
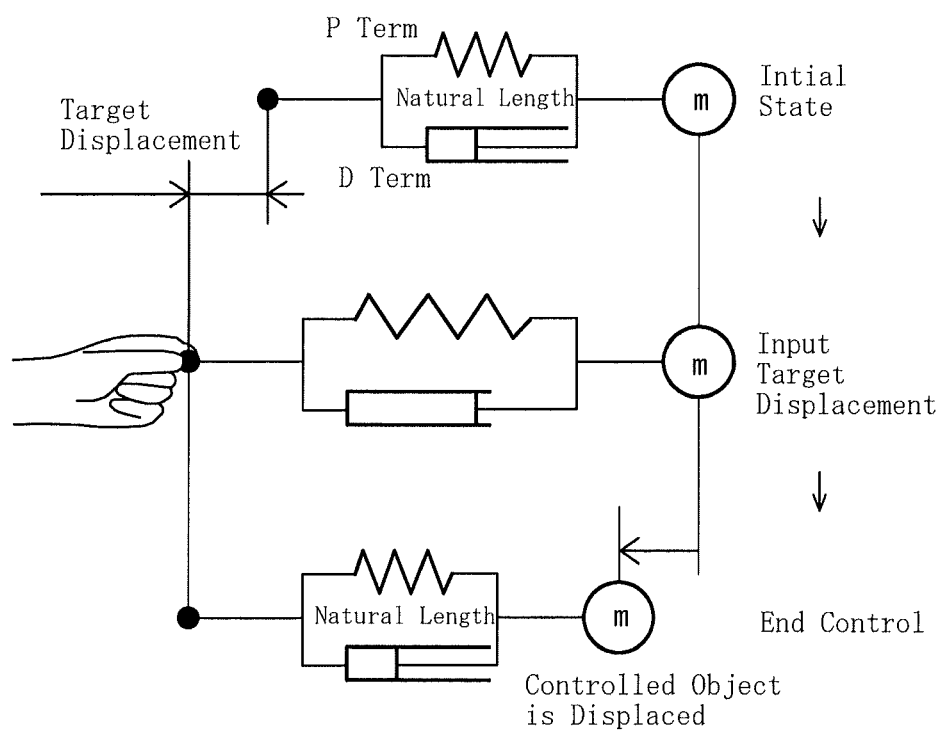
FIG. 12 is a diagram showing a PID control model for explaining PID control.

In contrast to this, the PID control of the prior art is based on a damping oscillation model with a basic mass m, spring, and damper system as shown in FIG. 12 and the spring plays a role of the P term and the dashpot plays a role of the D term. The correction term at the zero point is the I term, but the I term does not have so much physical meaning here.

If this control is considered in energy conversion, as shown in the middle of FIG. 12, by inputting the target position, the spring is stretched as a target displacement and if the strain energy of the spring is input to the control system, the weight (mass m) begins to move by being pulled by the spring force. At this time, the conversion from strain energy into kinetic energy is carried out. When the weight m begins to move, the kinetic energy is converted into thermal energy by the dashpot and the energy is discharged to the outside of the system. If all the strain energy of the spring input initially is converted into the thermal energy, as shown at the bottom of FIG. 12, the weight m, which is the controlled object, stays at the target position as a result. In the PID control, the control output is determined from the motion state of the controlled object, and therefore, the PID control is a feedback control.

As described above, it can be said that the time optimal control and the PID control are fundamentally different, but if the P gain and D gain of the PID control are made very large and the upper limit of the output is cut at the maximum output of the actuator, the control output waveform of the PID control becomes close to the control output waveform of the time optimal control, and therefore, it is also possible to regard the time optimal control as the PID control in which the PD gains are increased to the limit. However, in the PID control, if the PD gains are made too large, the control diverges normally because of a delay in calculation and control. The reason for this is that the PID control is a feedback control and the control output is determined with a delay from a phenomenon at all times, and therefore, the control diverges if the delay becomes too large.

In contrast to this, the time optimal control is a feedforward control and the control output that has taken into consideration the motion from the start to its end is determined before a phenomenon at all times, and therefore, the control is stable and even if the control output equivalent to that in the PID control in which the PD gains are increased to the limit is output in the time optimal control, the control does not diverge.

Figure 10:
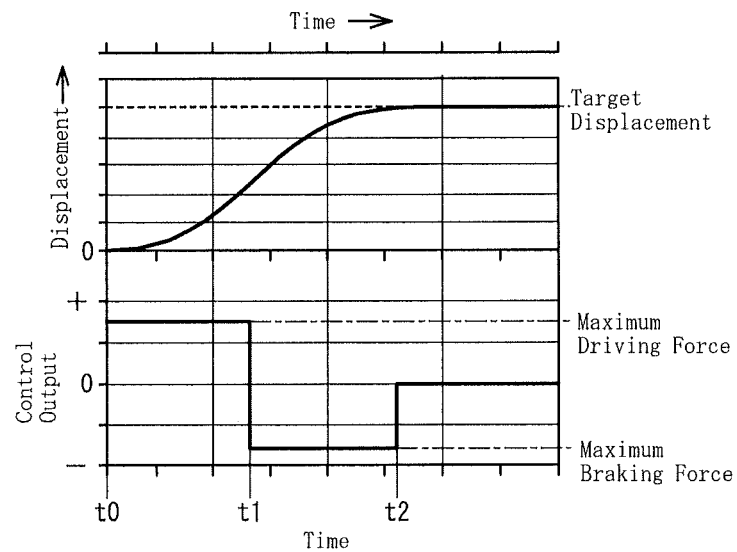
FIG. 10 is a diagram showing a control result in a case where there is no mechanical damping force of time optimal control of the prior art.
Figure 11:
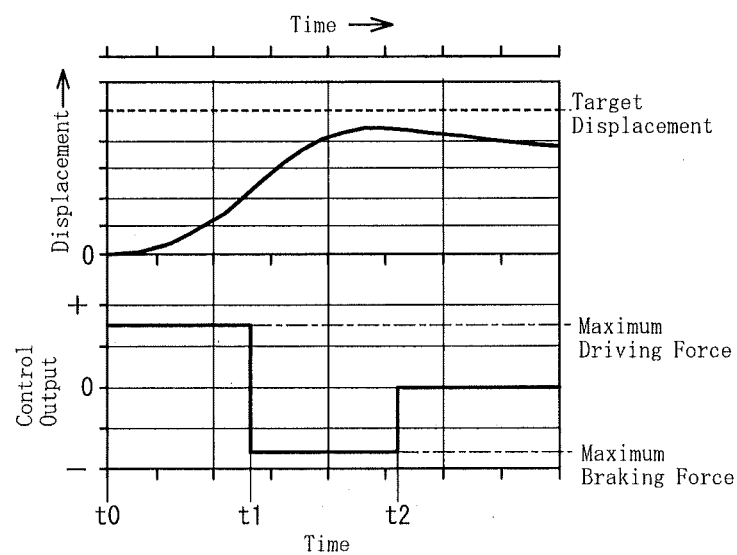
FIG. 11 is a diagram showing a control result in a case where there is a mechanical damping force of the time optimal control of the prior art.

The simplest example of the time optimal control is shown in FIG. 10 and FIG. 11. FIG. 10 shows a case where there is no mechanical damping force and FIG. 11 shows a case where there is a mechanical damping force. In FIG. 10 and FIG. 11, the actuator is operated toward a target by the maximum thrust force from the calculation time t0 and then, the actuator is operated at the maximum deceleration at the switching time t1, and then the thrust force of the actuator is reduced to zero at the end time t2. In this manner, in the time optimal control, control can be performed by determining the switching time t1 and the end time t2. It is possible to determine the switching time t1 and the end time t2 based on the calculation conditions below.

Under the calculation conditions, it is assumed that the controlled object reaches a target through two quadratic curves in contact with each other. Then, the maximum acceleration αp that the actuator can generate, the maximum deceleration αm that the actuator can generate, the deviation X between a target amount Tx and a controlled variable x (=target amount−controlled variable: difference between a target position and a position at the time of control) at the calculation time t0, and the velocity V0 of the controlled object at the calculation time t0 are assumed to be already-known values, and under restriction conditions that the two quadratic curves come into contact at the switching time t1, the velocity of the controlled object is reduced to zero (V=0) at the end time t2, and the deviation X is reduced to zero (X=0) at the end time t2, then, the switching time t1 and the end time t2 are found.

Figure 2:
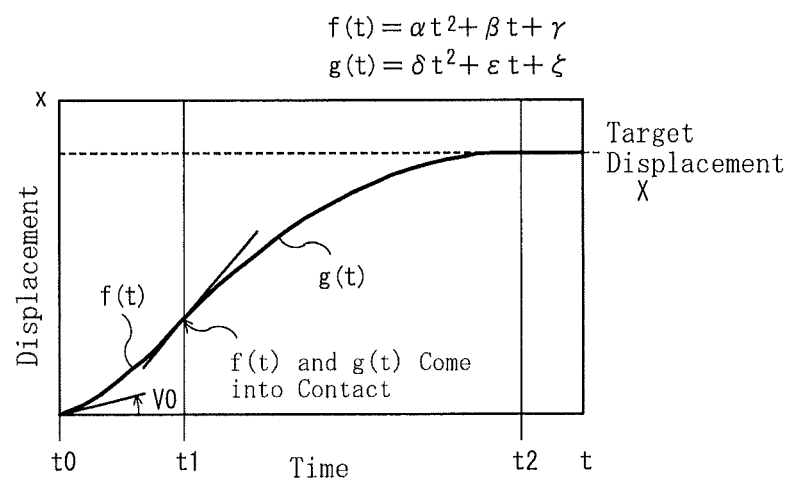
FIG. 2 is a diagram for explaining calculation conditions of a control trajectory.

It is assumed that the control trajectory is configured by two quadratic curves f (t) and g (t) as shown in FIG. 2, and based on the conditions below, the switching time t1 at which the control outputs are switched and the end time t2 at which the control output is ended are found. Further, the accelerations α1 and α2 are determined from Table 1. Moreover, V0 is a first-order derivative value (or difference value) of the controlled variable obtained during the control.

Calculation conditions are (1) to (7) below.

(1) The maximum acceleration αp and the maximum deceleration αm that the actuator can generate at the time of the maximum output are already known, that is, are obtained by accelerations measured in advance.

(2) The velocity V0 at the calculation time t0 is already known, that is, is obtained from the first-order derivative value (or difference) of the measured value.

(3) The value of the first quadratic curve f (t0) at the calculation time t0 is zero.

(4) The first-order derivative value of the first quadratic curve f (t0) at the calculation time t0 is the velocity (initial velocity) at the time t0.

(5) The second quadratic curve g (t) comes into contact with the first quadratic curve f (t) at the switching time t1.

(6) The value of the second quadratic curve g (t2) at the end time t2 is the target value.

(7) The first-order derivative value of the second quadratic curve g (t) at the end time t2 is zero.

From the above conditions, Expression (3) to Expression (13) below are obtained. By putting them into simultaneous equations, the switching time t1 and the end time t2 of the output are found and the accelerations α1 and α2 are found. Here, α1 is the acceleration from the calculation time t0 to the switching time t1 and α2 is the acceleration from the switching time t1 to the end time t2, and when α1=αp, α2=αm, and when α1=αm, α2=αp.

(Formula 3)

$$f(t) = \alpha t^2 + \beta t + \gamma \qquad \text{Expression (3)}$$

$$g(t) = \delta t^2 + \varepsilon t + \xi \qquad \text{Expression (4)}$$

$$f(0) = 0 \qquad \text{Expression (5)}$$

$$\frac{df(0)}{dt} = V0 \qquad \text{Expression (6)}$$

$$\frac{d^2 f(0)}{dt^2} = \alpha 1 \qquad \text{Expression (7)}$$

$$f(t1) = g(t1) \qquad \text{Expression (8)}$$

$$\frac{df(t1)}{dt} = \frac{dg(t1)}{dt} \qquad \text{Expression (9)}$$

$$g(t2) = X \qquad \text{Expression (11)}$$

$$\frac{dg(t2)}{dt} = 0 \qquad \text{Expression (12)}$$

$$\frac{d^2 g(t2)}{dt^2} = \alpha 2 \qquad \text{Expression (13)}$$

From Expression (3) and Expression (5),
(Formula 4)

$$\gamma = 0 \qquad \text{Expression (13)}$$

from Expression (3), Expression (6), and Expression (13a), (Formula 5)
$$\frac{df(0)}{dt} = 2\alpha \cdot 0 + \beta = \beta = V0 \quad \text{Expression (14)}$$

from Expression (3) and Expression (7), (Formula 6)
$$\frac{df(0)}{dt} = 2\alpha = \alpha 1 \quad \text{Expression (15)}$$
$$\alpha = \frac{\alpha 1}{2}$$

from Expression (4) and Expression (12), (Formula 7)
$$\delta = \frac{\alpha 2}{2} \quad \text{Expression (16)}$$

from Expression (4), Expression (11), and Expression (16), (Formula 8)
$$\frac{dg(t2)}{dt} = 2\delta \cdot t2 + \varepsilon = \alpha 2 \cdot t2 + \varepsilon = 0 \quad \text{Expression (17)}$$
$$\varepsilon = -\alpha 2 \cdot t2$$

from Expression (4), Expression (10), Expression (16), and Expression (17), (Formula 9)
$$g(t2) = \delta \cdot t2^2 + \varepsilon \cdot t2 + \xi \quad \text{Expression (18)}$$
$$= \frac{\alpha 2}{2} t2^2 - \alpha 2 \cdot t2^2 + \xi$$
$$= -\frac{\alpha 2}{2} t2^2 + \xi = X$$

by modifying Expression (18), (Formula 10)
$$\xi = X + \frac{\alpha 2}{2} t2^2 \quad \text{Expression (19)}$$

from Expression (3), Expression (5), Expression (9), Expression (15), Expression (16), Expression (17), and Expression (19), (Formula 11)
$$\frac{df(t1)}{dt} = \frac{dg(t1)}{dt} \quad \text{Expression (20)}$$
$$\alpha 1 \cdot t1 + V0 = \alpha 2 \cdot t1 - \alpha 2 \cdot t2$$
$$t2 = \frac{-(\alpha 1 - \alpha 2)t1 - V0}{\alpha 2}$$

from Expression (3), Expression (5), Expression (8), Expression (15), Expression (16), Expression (17), Expression (19), and Expression (20), (Formula 12)

Expression (21)
$$\frac{\alpha 1}{2} t1^2 + V0 \cdot t1 = \frac{\alpha 2}{2} t1^2 - \alpha 2 \cdot t2 \cdot t1 + X + \frac{\alpha 2}{2} t2^2$$
$$= \frac{(\alpha 1 - \alpha 2)}{2} t1^2 + (V0 + \alpha 2 \cdot t2)t1 - X - \frac{\alpha 2}{2} t2^2$$
$$= \frac{(\alpha 1 - \alpha 2)}{2} t1^2 + V0 + \left[\alpha 2 \frac{-(\alpha 1 - \alpha 2)t1 - V0}{\alpha 2}\right]t1 -$$
$$X - \frac{\alpha 2}{2}\left[\frac{-(\alpha 1 - \alpha 2)t1 - V0}{\alpha 2}\right]^2$$
$$= -\frac{(\alpha 1 - \alpha 2)}{2} t1^2 - X - \frac{((\alpha 1 - \alpha 2)t1 + V0)^2}{2\alpha 2}$$
$$= -\frac{(\alpha 1 - \alpha 2)}{2} t1^2 -$$
$$X - \frac{(\alpha 1 - \alpha 2)^2 t1^2 + 2V0(\alpha 1 - \alpha 2)t1 + V0^2}{\alpha 2}$$
$$= -\alpha 2(\alpha 1 - \alpha 2)^2 t1^2 - 2\alpha 2 \cdot X - (\alpha 1 - \alpha 2)^2 t1^2 -$$
$$2V0(\alpha 1 - \alpha 2)t1 - V0^2$$
$$= -\alpha 1(\alpha 1 - \alpha 2)^2 t1^2 - 2V0(\alpha 1 - \alpha 2)t1 - 2\alpha 2 \cdot X - V0^2 = 0$$
$$\alpha 1(\alpha 1 - \alpha 2)^2 t1^2 + 2(\alpha 1 - \alpha 2)V0 \cdot t1 + 2\alpha 2 \cdot X + V0^2 = 0$$

by modifying Expression (21),
(Formula 13)
$$(\alpha 1 - \alpha 2)\alpha 1 \cdot t1^2 + 2(\alpha 1 - \alpha 2)V0 \cdot t1 + V0^2 + 2X \cdot \alpha 2 = 0 \quad \text{Expression (22)}$$

by applying formula for solution of the quadratic formula to Expression (22), (Formula 14)
$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (23)}$$

and by substituting Expression (23) in Expression (20), t2 is obtained.

Figure 4:
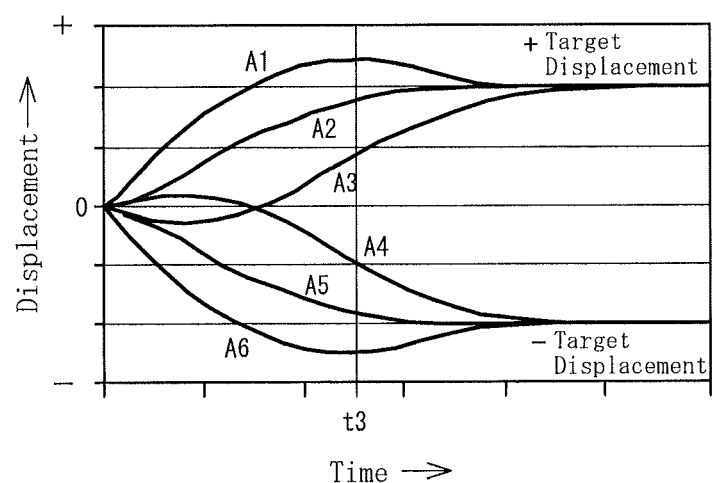
FIG. 4 is a diagram showing target trajectories that f (t) and g (t) can take.

Here, the trajectories that f (t) and g (t) can take will be six trajectories A1 to A6 shown in FIG. 4. Here, the six trajectories are classified according to the state.

A1 corresponds to a state where even if deceleration is performed at the maximum deceleration αm generated by the actuator when X>0 and V0>0, the target is overshot. If the time taken for the velocity to reduce to zero by performing deceleration at the maximum deceleration αm is taken to be t3, t3=V0/αm, and therefore, the condition under which overshoot occurs at the time t3 is V0×t3/2=V0²/2αm>X.

A2 corresponds to a state where if deceleration is performed at the maximum deceleration αm generated by the actuator when X>0 and V0>0, the target is not overshot. By the same calculation as that for A1, the condition under which overshoot does not occur at the time t3 is V0²/2αm<X.

A3 is the trajectory under the condition that X>0 and V0<0 and A4 under the condition that X<0 and V0>0. Moreover, A5 corresponds to a state where if deceleration is performed at the maximum deceleration αp generated by the actuator when X<0 and V0<0, the target is not overshot. By the same calculation as that for A1, the condition under which overshoot does not occur at the time t3 is V0²/2αp>X.

A6 corresponds to a state where even if deceleration is performed at the maximum deceleration αp generated by the actuator when X<0 and V0<0, the target is overshot. By the same calculation as that for A1, the condition under which overshoot occurs at the time t3 is $V0^2/2\alpha p < X$.

A1, A2, and A3 show the change from the upwardly convex shape into the downwardly convex shape and $\alpha 1 = \alpha m < 0$ and $\alpha 2 = \alpha p > 0$ hold, and A4, A5, and A6 show the change from the downwardly convex shape into the upwardly convex shape and $\alpha 1 = \alpha p > 0$ and $\alpha 2 = \alpha m < 0$. From the above, $\alpha 1$ and $\alpha 2$ are determined.

This classification according to the state is shown in Table 1.

TABLE 1

| A1 | X > 0 | $V_0 > 0$ | $V_0^2/2\ \alpha m > X$ | $\alpha 1 = \alpha m, \alpha 2 = \alpha p$ |
|---|---|---|---|---|
| A2 | | | $V_0^2/2\ \alpha m < X$ | $\alpha 1 = \alpha p, \alpha 2 = \alpha m$ |
| A3 | | $V_0 < 0$ | | $\alpha 1 = \alpha p, \alpha 2 = \alpha m$ |
| A4 | X < 0 | $V_0 > 0$ | | $\alpha 1 = \alpha m, \alpha 2 = \alpha p$ |
| A5 | | $V_0 < 0$ | $V_0^2/2\ \alpha p > X$ | $\alpha 1 = \alpha m, \alpha 2 = \alpha p$ |
| A6 | | | $V_0^2/2\ \alpha p < X$ | $\alpha 1 = \alpha p, \alpha 2 = \alpha m$ |

By multiplying $\alpha 1$ and $\alpha 2$ obtained as described above by a virtual mass m, the actuator thrust force is found. That is, between the calculation time t0 and the switching time t1, an actuator thrust force 1 ($=\alpha 1 \times$ virtual mass) is obtained and between the switching time t1 and the end time t2, an actuator thrust force 2 ($=\alpha 2 \times$ virtual mass) is obtained.

Figure 5:
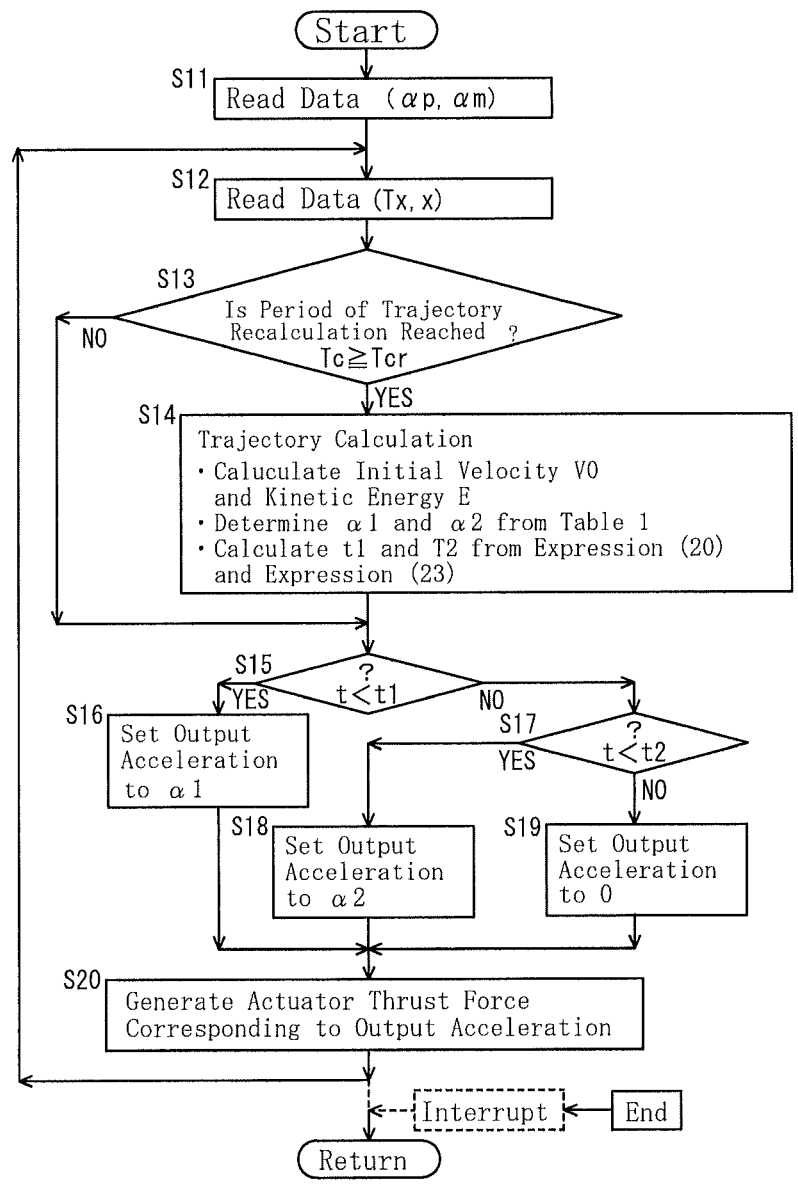
FIG. 5 is a diagram showing an example of a control flow of the actuator control method of the embodiment of the present invention.

It is possible to perform the time optimal control used in the actuator control method of the embodiment of the present invention in accordance with a control flow as shown in FIG. 5. When the control flow starts, at step S11, data of the maximum acceleration $\alpha p$ and the maximum deceleration $\alpha m$ is read. At the next step S12, data of the target amount (target value) Tx and the controlled variable (controlled value) x is read. At the same time, counting of an elapsed time t and an elapsed time for recalculation tc is started.

At step S13, whether or not the period of trajectory recalculation is reached, that is, whether or not the elapsed time for recalculation tc after the trajectory is calculated becomes equal to or more than a period of trajectory recalculation tcr is determined. In the case where the period of trajectory recalculation tcr is reached (YES) at step S13, the procedure proceeds to step S15 after calculating the trajectory again at step S14 and in the case where the period of trajectory recalculation is not reached (NO) at step S13, the procedure proceeds to step 15, bypassing the trajectory calculation at step S14. It is preferable to set the period of trajectory recalculation tcr to a period about 1/10 of the control period, but there arise no problem even if the period of trajectory recalculation tcr is set the same as the control period.

In the trajectory calculation at step S14, the initial velocity V0 is calculated by "$V0=(x-x_{-1})/tcr$" ($x_{-1}$ is the controlled variable before the calculation period) and kinetic energy E is calculated by "$E=V0^2/2$", and $\alpha 1$ and $\alpha 2$ are determined from Table 1, and by Expression (23) and Expression (20), the switching time t1 and the end time t2 are calculated. Further, the elapsed time for recalculation tc is reset to zero (Tc=0).

At step S15, whether or not the elapsed time t is smaller than the switching time t1 is determined and in the case where the elapsed time t is smaller than the switching time t1 (YES), the procedure proceeds to step S16 and then proceeds to step S20 after setting the output acceleration to $\alpha 1$. In the case where the elapsed time t is not smaller than the switching time t1 (NO) at step S15, the procedure proceeds to step S17 and determining whether or not the elapsed time t is smaller than the end time t2 and in the case where the elapsed time t is smaller than the end time t2 (YES), the procedure proceeds to step S18 and then to step S20 after setting the output acceleration to $\alpha 2$. In the case where the elapsed time t is not smaller than the end time t2 (NO) at step S17, the procedure proceeds to step S19 and then to step S20 after setting the output acceleration to "zero".

At step S20, the actuator thrust force corresponding to the output acceleration is kept being generated during a preset time (time in relation to the interval of various kinds of determination) and the controlled object is controlled. Further, the elapsed time t and the elapsed time for recalculation tc are counted. After that, the procedure returns to step S12 and repeats step S12 to step S20. Due to this, it is possible to control the actuator thrust force while calculating the trajectory again at step S14 each time the elapsed time for recalculation tc reaches the period of trajectory recalculation tcr.

If an event by which the control in FIG. 5 should be ended occurs, such as the elapsed time t exceeds a preset time and a switch signal to end the control is input, an interrupt occurs even when any step of the control flow is performed and the procedure proceeds to return and returns to the upper control flow, and when the upper control flow ends, the control flow in FIG. 5 also ends.

By switching the operations of the actuator at the switching time t1 and the end time t2 found as described above, an ideal control result as shown in FIG. 10 is obtained. However, this result is a result under ideal circumstances where there is no friction, damping, or errors. If a mechanical damping force exists in the controlled object, the control result will no longer agree with the target as shown in FIG. 11.

Figure 3:
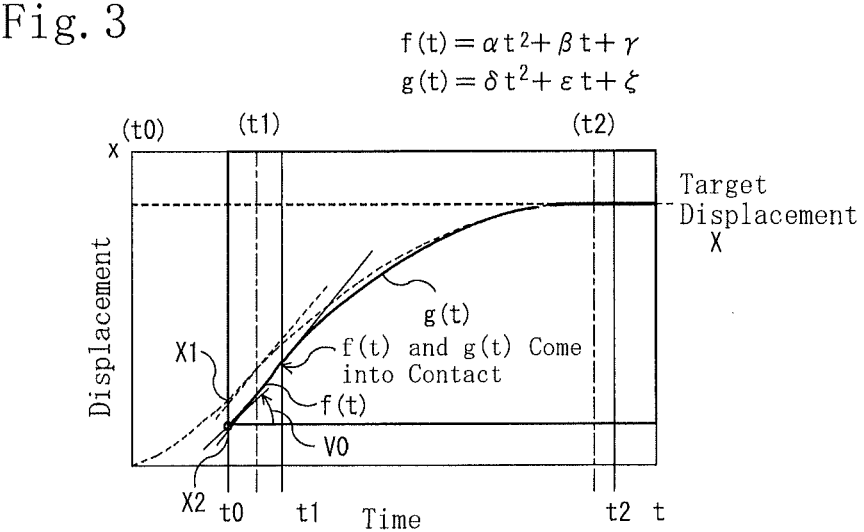
FIG. 3 is a diagram for explaining a change in the control trajectory in recalculation.

In order to solve this problem, in the actuator control method of the present invention, the target trajectory is modified at each time in a fixed period or preset irregularly. During the period of time of reset for modification, such as the fixed period, it is necessary to set the reset signal period to T/2 or less relative to a fluctuation period T within tolerance. The way the control trajectory changes due to the recalculation is shown in FIG. 3. In FIG. 3, in the case where the displacement that should be X1 according to the control trajectory (dotted line) by the initial calculation is actually X2, a new control trajectory (solid line) is calculated by recalculation and the switching time t1 and the end time t2 change to new values, and the control force is controlled based on the new switching time t1 and the end time t2 as a result.

Figure 6:
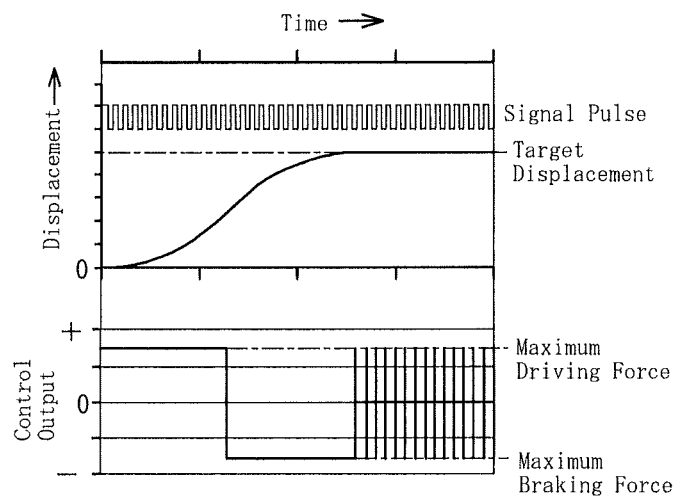
FIG. 6 is a diagram showing a control result in a case where there is no mechanical damping force of feedback time optimal control of the actuator control method of the embodiment of the present invention.
Figure 7:
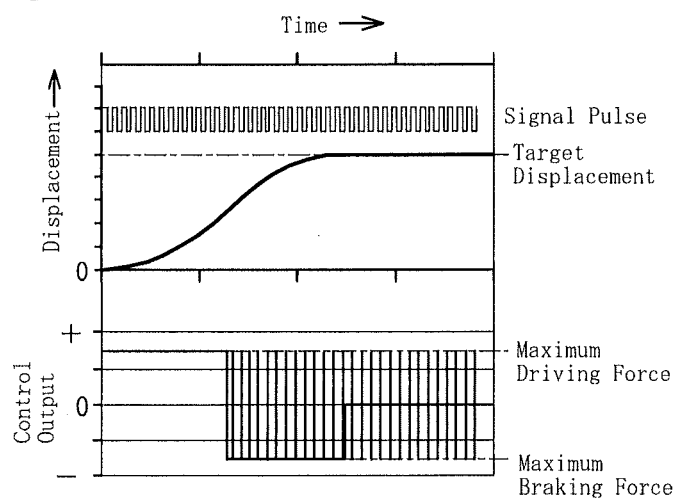
FIG. 7 is a diagram showing a control result in a case where there is a mechanical damping force of the feedback time optimal control of the actuator control method of the embodiment of the present invention.

The control results when the switching time t1 and the end time t2 are calculated again for each fixed period are shown in FIG. 6 and FIG. 7. Recalculation is performed with a timing of the rise of the signal pulse. In order to distinguish this time optimal control method from the time optimal control method of the prior art, this time optimal control method is called a feedback (FB) time optimal control method here. FIG. 6 shows the case where there is no mechanical damping force and FIG. 7 shows the case where there is a mechanical damping force, but it is known that it is possible to cause the controlled object to agree with the target position by substantially an ideal trajectory even in the case where there is a mechanical damping force in the controlled object as shown in FIG. 7 as a result.

Figure 8:
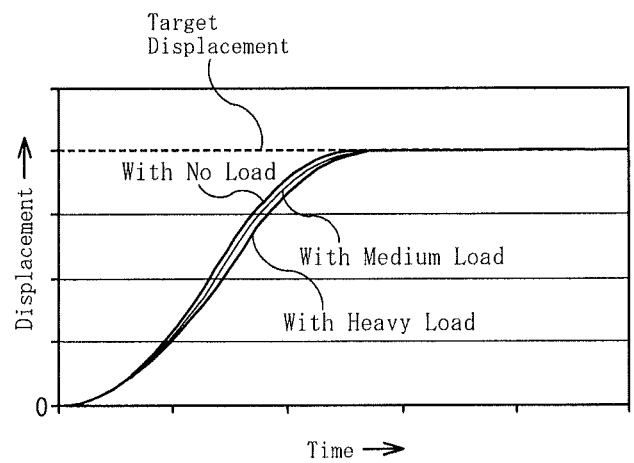
FIG. 8 is a diagram showing a simulation result of an example.
Figure 9:
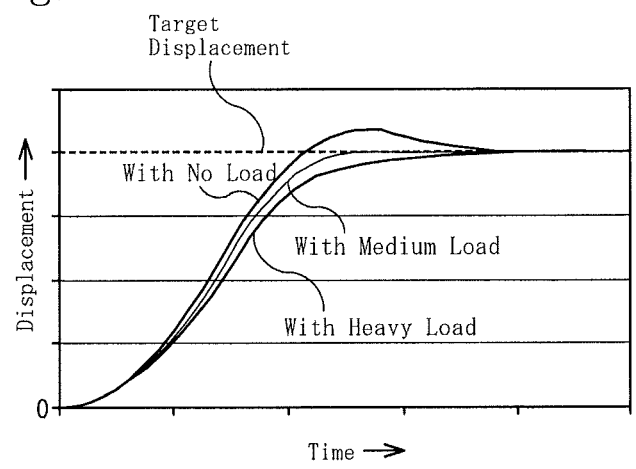
FIG. 9 is a diagram showing a simulation result of a comparative example.

FIG. 8 shows a simulation result of an example of the feedback time optimal control and FIG. 9 shows a simulation result of a comparative example of the PID control. The comparison of these results indicates that the control result changes significantly depending on the load fluctuation of the control system in the comparative example of the PID control shown in FIG. 9, but the control result is not disturbed and the stable control result is obtained at all times in the example of the feedback time optimal control shown in FIG. 8. That is, in the comparative example in FIG. 9, the control result changes significantly depending on the load fluctuation of the control system, but in the example in FIG. 8, the control result is not disturbed and the stable control result is obtained at all times.

Consequently, according to the actuator control method and the actuator control device described above, the control speed becomes high because of the time optimal control, the maximum acceleration and the maximum deceleration can be set by measurement, and it is not necessary to adjust the control gain because there is no item to be adjusted other than this. Further, it is not necessary to produce an intermediate output because of the ON/OFF control, and therefore, it is possible to simplify the controller and driver.

Further, the element of feedback is incorporated, in which the switching time t1 and the end time t2 are updated by inputting the deviation X between the target amount and the controlled variable at each time of the control at each preset time, and therefore, even if the external force changes or without shortening the control period, it is possible to obtain a stable control result at all times. As a result of that, it is possible to satisfy both of "control speed" and "stability", which have been big conflicting issues in the conventional control law.

According to the actuator control method and the actuator control device of the present invention, the control speed becomes high, it is not necessary to adjust the control gain, and it is not necessary to produce an intermediate output because of the ON/OFF control, and therefore, it is possible to simplify the controller and driver, and further, the element of feedback is incorporated, in which the switching time t1 and the end time t2 are updated by inputting the deviation X between the target amount and the controlled variable at each time of the control at each preset time, and therefore, even if the external force changes or without shortening the control period, it is possible to obtain a stable control result at all times, and therefore, it is possible to utilize the actuator control method and the actuator control device of the present invention, as the actuator control method and the actuator control device for the position control using, for example, electric power, hydraulic power, and pneumatic power, of equipment etc. mounted on automobiles etc., and other controlled objects to which the PID control is applied.

In the case of two degrees of freedom, control with two degrees of freedom is enabled by applying the control of the present invention independently in the X direction and in the Y direction, respectively, and therefore, it is possible to apply the control of the present invention to the control with multiple degrees of freedom, not only to the control with one degree of freedom.

The invention claimed is:

1. An actuator control method using time optimal control, comprising:

a calculation step of calculating a switching time t1 at which an acceleration output is switched to a deceleration output and an end time t2 of the deceleration output expressed by time elapsed from a calculation time t0 at which calculation for control is performed using a maximum acceleration αp and a maximum deceleration αm, which are measured in advance, at a time of a maximum output of a control force of the actuator; and a control output step of setting the control force of the actuator to a maximum acceleration output from the calculation time t0 to the switching time t1, setting the control force of the actuator to a maximum deceleration output from the switching time t1 to the end time t2, and ending the output of the control force at the end time t2, and the method also calculates and updates the switching time t1 and the end time t2 by repeating the calculation step at each preset time, wherein, at the calculation step, in a case where a trajectory from a position at the calculation time t0 to a target position at the end time t2 is represented by a combination of two quadratic curves in contact with each other, initial velocity is taken to be V0, and a deviation between the target position and a controlled variable is taken to be X, the switching time t1 and the end time t2 are calculated using Expression (1) and Expression (2) below (Formula 1)

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

(Formula 2)

$$t2 = \frac{-(\alpha 1 - \alpha 2)t1 - V0}{\alpha 2} \quad \text{Expression (2)}$$

where α1 is the maximum acceleration αp or the maximum deceleration αm between the calculation time t0 and the switching time t1, and α2 is the maximum deceleration αm or the maximum acceleration αp between the switching time t1 and the end time t2.

2. An actuator control device using time optimal control, comprising:

a calculation unit configured to calculate a switching time t1 at which an acceleration output is switched to a deceleration output and an end time t2 of the deceleration output expressed by time elapsed from a calculation time t0 at which calculation for control is performed using a maximum acceleration αp and a maximum deceleration αm, which are measured in advance, at a time of a maximum output of a control force of the actuator;

a control output unit configured to set the control force of the actuator to a maximum acceleration output from the calculation time t0 to the switching time t1, to set the control force of the actuator to a maximum deceleration output from the switching time t1 to the end time t2, and to end the output of the control force at the end time t2; and an update unit configured to repeatedly calculate and update the switching time t1 and the end time t2 by the calculation unit at each preset time, wherein the calculation unit, in a case where a trajectory from a position at the calculation time t0 to a target position at the end time t2 is represented by a combination of two quadratic curves in contact with each other, initial velocity is taken to be V0, and deviation between the target position and a controlled variable is taken to be X, calculates the switching time t1 and the end time t2 using Expression (1) and Expression (2) below (Formula 1)

$$t1 = \frac{-2(\alpha1 - \alpha2)V0 \pm \sqrt{4(\alpha1 - \alpha2)^2 V0^2 - 4(\alpha1 - \alpha2)(V0^2 - 2X\alpha2)\alpha1}}{2\alpha1(\alpha1 - \alpha2)}$$

Expression (1)

(Formula 2)

$$t2 = \frac{-(\alpha1 - \alpha2)t1 - V0}{\alpha2}$$

Expression (2)

where α1 is the maximum acceleration αp or the maximum deceleration αm between the calculation time t0 and the switching time t1, and α2 is the maximum deceleration αm or the maximum acceleration αp between the switching time t1 and the end time t2.

3. The actuator control method according to claim 1, wherein the acceleration αp between the calculation time t0 and the switching time t1 and the deceleration αm between the switching time t1 and the end time t2 are determined from Table 1

TABLE 1

| | | | | |
|---|---|---|---|---|
| A1 | X > 0 | $V_0 > 0$ | $V_0^2/2$ αm > X | α1 = αm, α2 = αp |
| A2 | | | $V_0^2/2$ αm < X | α1 = αp, α2 = αm |
| A3 | | $V_0 < 0$ | | α1 = αp, α2 = αm |
| A4 | X < 0 | $V_0 > 0$ | | α1 = αm, α2 = αp |
| A5 | | $V_0 < 0$ | $V_0^2/2$ αp > X | α1 = αm, α2 = αp |
| A6 | | | $V_0^2/2$ αp < X | α1 = αp, α2 = αm. |

4. The actuator control device according to claim 2, wherein the acceleration αp between the calculation time t0 and the switching time t1 and the deceleration αm between the switching time t1 and the end time t2 are determined from Table 1

TABLE 1

| | | | | |
|---|---|---|---|---|
| A1 | X > 0 | $V_0 > 0$ | $V_0^2/2$ αm > X | α1 = αm, α2 = αp |
| A2 | | | $V_0^2/2$ αm < X | α1 = αp, α2 = αm |
| A3 | | $V_0 < 0$ | | α1 = αp, α2 = αm |
| A4 | X < 0 | $V_0 > 0$ | | α1 = αm, α2 = αp |
| A5 | | $V_0 < 0$ | $V_0^2/2$ αp > X | α1 = αm, α2 = αp |
| A6 | | | $V_0^2/2$ αp < X | α1 = αp, α2 = αm. |

\* \* \* \* \*